United States Patent [19]

Hallett et al.

[11] 4,011,371
[45] Mar. 8, 1977

[54] MEANS FOR DETECTING AND NEUTRALIZING LEAKS IN ELECTROCHEMICAL CELLS

[75] Inventors: Joseph L. Hallett, Seneca Falls; Peter H. Rollason, Cayuga; Thaddeus V. Rychlewski, Seneca Falls, all of N.Y.

[73] Assignee: GTE Sylvania Incorporated, Stamford, Conn.

[22] Filed: Dec. 17, 1975

[21] Appl. No.: 641,487

[52] U.S. Cl. .............................. 429/174; 429/185
[51] Int. Cl.² ......................................... H01M 2/08
[58] Field of Search .......... 136/133, 163, 179, 169, 136/170, 107, 166; 429/174, 185

[56] References Cited
UNITED STATES PATENTS

| | | | |
|---|---|---|---|
| 1,583,648 | 5/1926 | Benner | 136/179 |
| 2,331,450 | 10/1943 | Baum | 136/179 |
| 2,482,514 | 9/1949 | Ruben | 136/179 |
| 3,082,285 | 3/1963 | Stark | 136/169 |
| 3,909,295 | 9/1975 | Tsychida et al. | 136/163 |

*Primary Examiner*—Donald L. Walton
*Attorney, Agent, or Firm*—Norman J. O'Malley; William H. NcNeill; Robert T. Orner

[57] ABSTRACT

A neutralizing agent is maintained adjacent the seal area of electrochemical cells containing corrosive electrolytes. The neutralizing agent can be kept in a pocket or depression formed in a flange next to the seal or can be contained in a suitable plastic ring which surrounds the seal. When the electrolyte is thionyl chloride and aluminum chloride a suitable neutralizing agent is sodium carbonate.

7 Claims, 2 Drawing Figures

MEANS FOR DETECTING AND NEUTRALIZING LEAKS IN ELECTROCHEMICAL CELLS

BACKGROUND OF THE INVENTION

This invention relates to electrochemical cells and more particularly to leak neutralizing means associated with such cells which contain a corrosive electrolyte. Recent industry demands for ever smaller and more powerful energy sources has lead to the development of batteries which employ very reactive materials. One such cell which is currently being developed employs an oxidizable lithium anode and an inert carbon cathode. A proposed electrolyte for such a cell comprises a solvent of thionyl chloride and a solute of aluminum chloride. Both the thionyl chloride and aluminum chloride are corrosive materials. While cells employing such an electrolyte are theoretically hermetically sealed, the problem of a leaking cell always exists. It would be an advance in the art if some means were provided for neutralizing any of the corrosive electrolyte which might leak from such a cell.

OBJECTS AND SUMMARY OF THE INVENTION

It is therefore an object of this invention to enhance electrochemical cells.

It is another object of the invention to provide an electrochemical cell which employs means for neutralizing the leakage of a corrosive electrolyte.

These objects are accomplished in one aspect of the invention by the provision of an electrochemical cell which comprises a container or a body portion for containing positive and negative electrodes and a corrosive electrolyte therefor. The container is closed by means of a cap which is sealed to the container. Also provided are means associated with the seal which include a neutralizing agent for the corrosive electrolyte contained within the container.

DESCRIPTION OF THE PREFERRED EMBODIMENTS

For a better understanding of the present invention together with other and further objects, advantages, and capabilities thereof, reference is made to the following disclosure and appended claims in conjunction with the above-described drawings.

Figure 1:
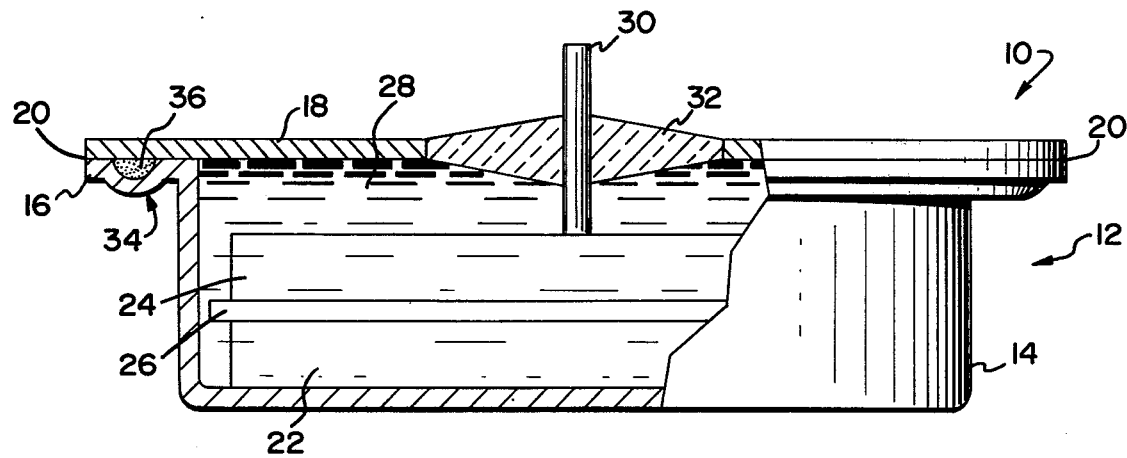
FIG. 1 is an elevational, sectional view of an electrochemical cell employing one embodiment of the invention.

Referring now to the drawings with greater particularity there is shown in FIG. 1 an electrochemical cell 10 comprising a container 12 which has a substantially cup-shaped portion 14 of a suitable material, such as stainless steel, which is provided with a peripheral outstanding flange 16. A lid 18 of a suitable material, such as Kovar or Rodar, is provided to seal the opening of the can 14 and is peripherally sealed thereto at 20. Provided within the interior of container portion 14 are a positive electrode 22 and a negative electrode 24 which can be separated by a separator 26. Filling the remainder of the interior and surrounding the electrodes is a corrosive electrolyte 28. One of the electrodes, in this case the positive one, is in contact with the can 14 and the negative electrode 24 has an external connection 30 in the form of an electrically conductive pin which protrudes through lid 18 and is insulated therefrom by means of a glass seal 32.

Means 34 are provided associated with the seal 20 and contains a neutralizing agent 36 for neutralizing the corrosive electrolyte in the event of a leak. In the embodiment shown in FIG. 1 the means 34 comprises a depression or pocket formed within flange 16 and which contains the neutralizing agent 36.

In a typical high energy cell having a lithium anode and a carbon cathode and a corrosive electrolyte of thionyl chloride and aluminum chloride, the neutralizing agent can be sodium carbonate. It will be obvious, however, that the neutralizing agent employed will be dependent upon the electrolyte used.

Figure 2:
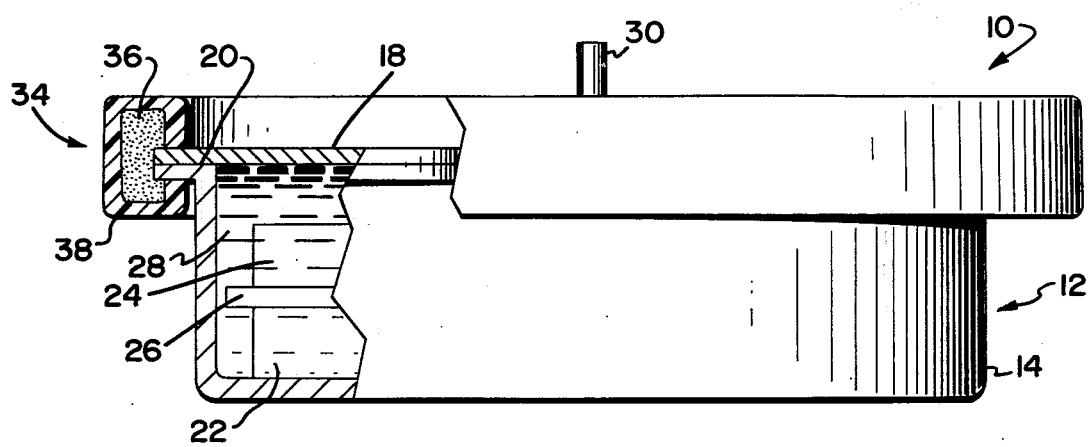
FIG. 2 is an elevational, sectional view of an electrochemical cell employing an alternate embodiment of the invention.

Referring now to FIG. 2 there is shown an alternate embodiment of the invention. In this embodiment the means 34 associated with the seal area 20, comprises a hollow plastic ring 38 which surrounds and encompasses the seal 20. The neutralizing agent 36 is maintained within the interior of the hollow plastic ring.

While the neutralizing agent will effectively neutralize the corrosive electrolyte and render it harmless, the embodiment of FIG. 2 can be further enhanced by forming the plastic ring 38 of a transparent plastic material and providing a coloring agent with the neutralizing agent. The coloring agent should be such as to change its color whenever a reaction occurs between the neutralizing agent and the corrosive electrolyte, thus giving a visual indication of the presence of a leak.

The incorporation of a neutralizing agent at the seal area of an electrochemical cell is seen as a distinct advance in the art by effectively neutralizing the leakage of a corrosive electrolyte.

While there have been shown what are at present considered to be the preferred embodiments of the invention it will be apparent to those skilled in the art that various changes and modifications can be made herein without departing from the scope of the invention as defined by the appended claims.

What is claimed is:

1. An electrochemical cell comprising: a container having a substantially cup-shaped portion and a lid therefor peripherally sealed to said cup-shaped portion; a positive and a negative electrode within said sealed container; a corrosive electrolyte within said sealed container and encompassing said electrodes; and means associated with said seal and forming an integral part with said container including a neutralizing agent for said corrosive electrolyte in the event of a leak, said integral part comprising a depression formed in a flange of said cup-shaped portion.

2. The cell of claim 1 wherein said neutralizing agent is contained within said depression.

3. The cell of claim 2 wherein said neutralizing agent is sodium carbonate.

4. An electrochemical cell comprising: a container having a substantially cup-shaped portion and a lid therefor peripherally sealed to said cup-shaped portion; a positive and a negative electrode within said sealed container; a corrosive electrolyte within said sealed container and encompassing said electrodes; and means associated with said seal including a neutralizing agent for said corrosive electrolyte in the event of a leak, said last named means being external to and surrounding said seal.

5. The cell of claim 4 wherein said last named means comprises an annular hollow plastic ring which surrounds said seal.

6. The cell of claim 5 wherein said neutralizing agent is contained within said hollow plastic ring.

7. The cell of claim 6 wherein said neutralizing agent is sodium carbonate.

* * * * *